(12) United States Patent
Wang et al.

(10) Patent No.: US 6,736,729 B2
(45) Date of Patent: May 18, 2004

(54) CONSTANT VELOCITY JOINT AND METHOD OF MAKING SAME

(75) Inventors: Shen-Ling Allen Wang, Northville, MI (US); John Ramey, St. Clair Shores, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/189,592

(22) Filed: Jul. 3, 2002

(65) Prior Publication Data

US 2004/0005931 A1 Jan. 8, 2004

(51) Int. Cl.[7] ............................................. F16D 3/223
(52) U.S. Cl. ........................ 464/15; 464/906; 29/898.1
(58) Field of Search ........................ 464/15, 144, 145, 464/146, 906; 384/625; 29/898.066, 898.067, 898.069, 898.1, DIG. 16, DIG. 23

(56) References Cited

U.S. PATENT DOCUMENTS

| | | | | |
|---|---|---|---|---|
| 3,961,104 A | * | 6/1976 | Tanner | ................... 384/625 X |
| 4,253,714 A | * | 3/1981 | Bhushan | ................ 29/898.1 X |
| 5,695,405 A | * | 12/1997 | Kono | |
| 6,478,682 B1 | * | 11/2002 | Kura et al. | |
| 2001/0007832 A1 | * | 7/2001 | Takabe | ........................ 464/15 |

OTHER PUBLICATIONS

SAE Universal Joint and Driveshaft Design Manual, AE–7, Society of Automotive Engineers, Inc., Warrendale, PA, pp. 145–147, TJ1079.S62 1979.*

* cited by examiner

Primary Examiner—Greg Binda
(74) Attorney, Agent, or Firm—Dinnin & Dunn, P.C.; Mick A. Nylander, Esq.

(57) ABSTRACT

A constant velocity joint wherein one or more of the outer ball tracks, the inner ball tracks, or the balls have textured surfaces such as dimples or raised ridges to increase lubrication of the joint and enhance performance characteristics.

6 Claims, 13 Drawing Sheets

CONSTANT VELOCITY JOINT AND METHOD OF MAKING SAME

TECHNICAL FIELD

The present invention relates to an improved constant velocity joint and method of making the same for transferring torque between a drive element and a driven element.

BACKGROUND ART

There are generally four (4) main types of automotive drive line systems. More specifically, there exists a full-time front wheel drive system, a full-time rear wheel drive system, a part-time four wheel drive system, and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front drive wheels must normally rotate faster than the rear wheels.

Drive line systems also include one or more Cardan (Universal) and Constant Velocity joints (CVJ's). Cardan joints are the most basic and common joint type used, for example, on propshafts. Although highly durable, Cardan joints are typically not suited for applications with high angles (e.g. >2 degrees) because of their inability to accommodate constant velocity rotary motion. Constant Velocity joints, in contrast, are well known in the art and are employed where transmission of a constant velocity rotary motion is desired or required. For example, a tripod joint is characterized by a bell-shaped outer race (housing) disposed around an inner spider joint which travels in channels formed in the outer race. The spider-shaped cross section of the inner joint is descriptive of the three equispaced arms extending therefrom which travel in the tracks of the outer joint. Part spherical rollers are featured on each arm.

One type of constant velocity universal joint is the plunging tripod type, characterized by the performance of end motion in the joint. Plunging tripod joints are currently the most widely used inboard (transmission side) joint in front wheel drive vehicles, and particularly in the propeller shafts found in rear wheel drive, all-wheel drive and 4-wheel drive vehicles. A common feature of tripod universal joints is their plunging or end motion character. Plunging tripod universal joints allow the interconnection shafts to change length during operation without the use of splines which provoke significant reaction forces thereby resulting in a source of vibration and noise.

The plunging tripod joint accommodates end wise movement within the joint itself with a minimum of frictional resistance, since the part-spherical rollers are themselves supported on the arms by needle roller bearings. In a standard ball roller type constant velocity joint the intermediate member of the joint (like the ball cage in a rzeppa constant velocity joint) is constrained to always lie in a plane which bisects the angle between the driving and driven shafts. Since the tripod type joint does not have such an intermediate member, the medium plane always lies perpendicular to the axis of the drive shaft.

Another common type of constant velocity universal joint is the plunging VL or "cross groove" type, which consists of an outer and inner race drivably connected through balls located in circumferentially spaced straight or helical grooves alternately inclined relative to a rotational axis. The balls are positioned in a constant velocity plane by an intersecting groove relationship and maintained in this plane by a cage located between the two races. The joint permits axial movement since the cage is not positionably engaged to either race. As those skilled in the art will recognize, the principal advantage of this type of joint is its ability to transmit constant velocity and simultaneously accommodate axial motion. Plunging VL constant velocity universal joints are currently used for high speed applications such as, for example, the propeller shafts found in rear wheel drive, all-wheel drive and 4-wheel drive vehicles.

The high speed fixed joint (HSFJ) is another type of constant velocity joint well known in the art and used where transmission of high speed is required. High speed fixed joints allow articulation to an angle (no plunge) but can accommodate much higher angles than with a Cardan joint or other non-CV joints such as, for example, rubber couplings. There are generally three types of high speed fixed joints: (1) disk style that bolts to flanges; (2) monoblock style that is affixed to the tube as a center joint in multi-piece propshafts; and (3) plug-on monoblock that interfaces directly to the axle or T-case replacing the flange and bolts.

A HSFJ generally comprises: (1) an outer joint member of generally hollow configuration, having a rotational axis and in its interior, a plurality of arcuate tracks circumferentially spaced about the axis extending in meridian planes relative to the axis, and forming lands between the tracks and integral with the outer joint part wherein the lands have radially inwardly directed surfaces; (2) an inner joint member disposed within the outer joint member and having a rotational axis, the inner joint member having on its exterior a plurality of tracks whose centerline lie in meridian planes with respect to the rotational axis of the inner joint member in which face the tracks of the outer joint member and opposed pairs, wherein lands are defined between the tracks on the inner joint member and have radially outwardly directed surfaces; (3) a plurality of balls disposed one in each pair of facing tracks in the outer and inner joint members for torque transmission between the members; and (4) a cage of annular configuration disposed between the joint members and having openings in which respective balls are received and contained so that their centers lie in a common plane, wherein the cage has external and internal surfaces each of which cooperate with the land surfaces of the outer joint member and inner joint member, respectively to locate the cage and the inner joint member axially.

In joints of this kind, the configuration of the tracks in the inner and outer joint members, and/or the internal and external surfaces of the cage are such that, when the joint is articulated, the common plane containing the centers of the balls substantially bisects the angle between the rotational axis of the joint members. As indicated above, there are several types of high speed fixed joints differing from one another with respect to the arrangement and configuration of the tracks in the joint members and/or to the internal and external surfaces of the cage whereby the common bisector plane is guided as described above thereby giving the joint constant-velocity-ratio operating characteristics. In each design, however, the cage is located axially in the joint by cooperation between the external cage surface and the surfaces of the lands facing the cages surface.

The outer surface of the cage and cooperating land surfaces of the outer joint member are generally spherical. When torque is transmitted by the joint, the forces acting in the joint cause the cage to be urged (by e.g. ball expulsion forces) towards one end of the joint which end will depend on the respective directions of the offsets of the tracks in the inner and outer joint members from the common plane when the joint is in its unarticulated position. To reduce the normal forces acting on the cage as a result of these ball expulsion forces, the amount of spherical wrap by the outer joint member lands is maximized for increased cage support.

In a disc-style constant velocity fixed joint, the outer joint member is open on both ends and the cage is assembled from the end opposite the end towards which the cage is urged by the ball expulsion forces under articulated load conditions.

Assembly of the cage into the outer joint member is typically accomplished by either incorporating cage assembly notches into one of or a pair of lands in the outer joint member, or by sufficiently increasing the bore diameter of the outer joint part to allow the ball cage to be introduced into the outer joint part.

In a mono-block constant velocity fixed joint, also called a "mono-block high speed fixed joint", the outer joint part is a bell-shaped member having a closed end. Accordingly, the cage must be assembled from the open end of the outer joint member. To accommodate assembly of the cage into the outer joint part, the bore diameter of the outer joint part must be sufficiently increased to allow assembly and/or assembly notches must be incorporated into at least one opposing pair of the outer joint member lands to allow introduction of the cage.

A typical driveline system incorporates one or more of the above joints to connect a pair of propeller shafts (front and rear) to a power take off unit and a rear driveline module, respectively. These propeller shafts ("propshafts") function to transfer torque to the rear axle in rear wheel and all wheel drive vehicles.

As indicated above, constant velocity joints include outer and inner races, and a ball cage disposed between the races. The cage typically has a machined (substantially smooth) spherical outer cage surface that engages corresponding machined spherical inner surface portions of the outer race, and a machined spherical inner cage surface that engages corresponding machined spherical outer surface portions of the inner race. Such machined surfaces, while historically believed to provide optimum lubrication in bearings in general, are now believed to contribute to reduced bearing life clue to the contact effects of microscopic surface deviations. Specifically, these surface-originated failures are believed attributed to a lack of a fully separating lubricant film that permits undesirable metal-to-metal contact which destroys the contacting surfaces. In contrast, it has been found that bearing lubrication in general can be improved and thus bearing life enhanced by introducing special surface features that function to redistribute lubricant. See, the article, *Dimpled bearings ran smoother, longer,* Machine Design, Nov. 8, 2001.

Consequently, what is needed is a constant velocity joint and method of making the same having improved surface characteristics which function to redistribute joint lubricant and thus increase joint life by reducing frictional losses.

SUMMARY OF INVENTION

It is a principle object of the present invention to provide an improved constant velocity joint and method of making the same having reduced frictional losses and thus increased joint life.

In carrying out the above object, there is provided a constant velocity ball joint having an outer joint part (race) to be connected to a first drive part, and provided with an inner aperture in which there are formed outer ball tracks. The constant velocity ball joint further includes an inner joint part to be connected to a second drive part, and which forms an inner hub member which is positioned in the inner aperture of the out joint part and in which there are formed inner ball tracks. Still further, there is provided torque transmitting balls guided in the outer and inner ball tracks. A ball cage is arranged between the outer joint part and the inner joint part and which comprises circumferentially distributed cage windows in which the balls are held in a common plane. In keeping with the invention, one or more of the outer ball tracks, the inner ball tracks, or the balls themselves are provided with textured surfaces to increase lubrication of the joint and provide improved joint performance. The textured surfaces may take any suitable form depending only on the application and may include, for example, microgooves such as hexagonal or pentagonal shaped dimples. Textured surfaces may further include a raised network of ridges such as, for example, a tubular lattice network wherein the lattice network comprises a plurality of interlocking hexagons and pentagons with rounded edges.

In further carrying out the above object, there is provided a method of making a constant velocity ball joint having improved performance. The method comprises providing an outer joint part to be connected to a first drive part, the outer joint part having an inner aperture in which there are formed outer ball tracks. The method further comprises providing an inner joint part to be connected to a second drive part, the inner joint part forming an inner hub member which is positioned in the inner aperture of the outer joint part in on which there are formed inner ball tracks. Still further, the method comprises providing torque transmitting balls guided in the outer and inner ball tracks. A ball cage is further provided which is arranged between the outer joint part and the inner joint part and which comprises circumferentially distributed cage windows in which the balls are held in a common plane. In keeping with the invention, a surface texture is provided to one or more of the outer ball tracks, the inner ball tracks, or the balls themselves to increase lubrication of the joint and provide the aforementioned improved performance. Again, the surface texture may take any suitable form and may include micro grooves such as dimples and/or an interlocking lattice network.

These and other objects come with features and advantages of the invention will become more readily apparent from the following detailed description of the best modes for carrying out the invention when taken in conjunction with the accompanying drawings.

BRIEF DESCRIPTION OF DRAWINGS

FIG. 2c is a cross-section through the cage of the joint along line 2c—2c according to FIG. 2a.

FIG. 13 is a cross-section through the joint along line 14—14 according to FIG. 12;

BEST MODE FOR CARRYING OUT THE INVENTION

Figure 1A:
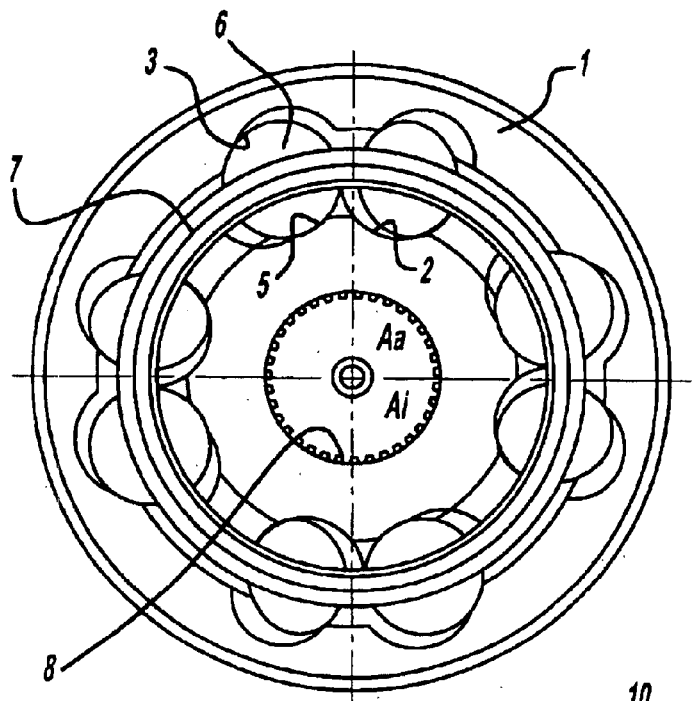
FIG. 1a is an axial view of a prior art constant velocity joint.
Figure 1B:
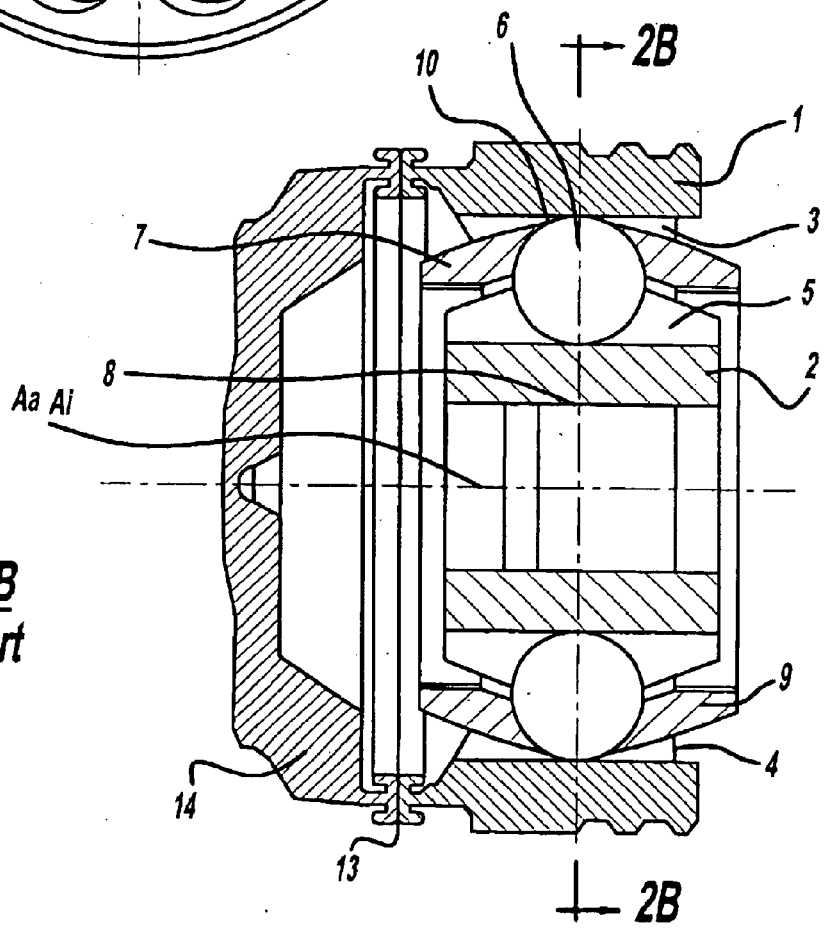
FIG. 1b is an axial section of the joint of FIG. 1.

Below, FIGS. 1a and 1b will be described jointly. They show an annular outer joint part 1 with a cylindrical inner face 4 and outer ball tracks 3, as well as an annular inner joint part 2 with an outer face 9 and inner ball tracks 5. A ball 6 is guided in the associated inner and outer ball tracks 3, 5. The longitudinal section shows the center lines B, C of the outer and inner ball tracks, which center lines B, C extend parallel to the longitudinal axes Aa, Ai, which are positioned in planes extending parallel to the longitudinal axes Aa, Ai, but which form an angle of intersection relative to the respective longitudinal axes Aa, Ai. The balls are held in a ball cage 7 in circumferentially distributed cage windows 10. A base part 14 is connected by a friction weld 13 to the outer joint part 1. The inner joint part 2 comprises an inner aperture 8 for inserting a plug-in shaft.

Figure 2A:
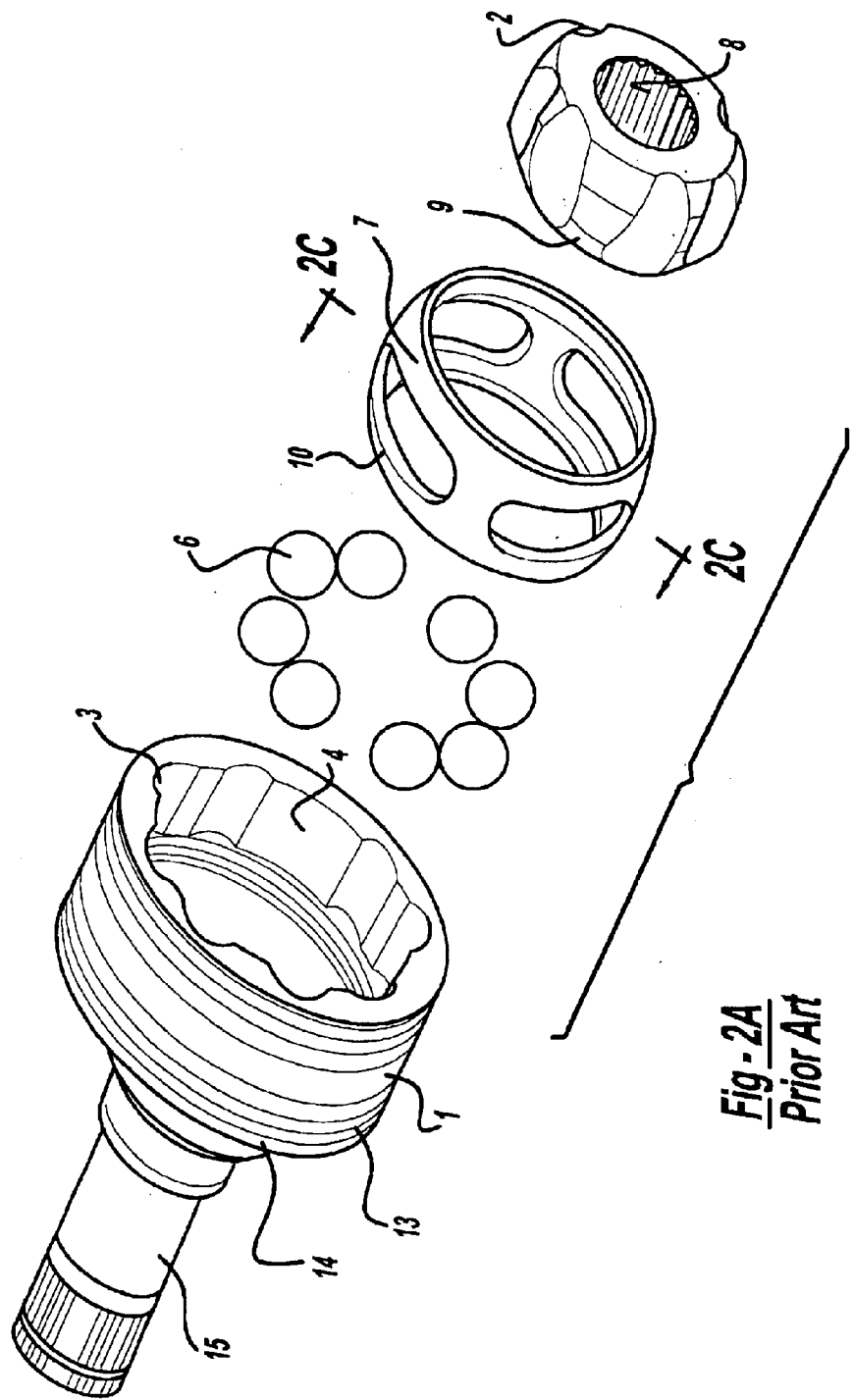
FIG. 2a is an exploded view of the joint of FIG. 1.

The joint shown in FIG. 2a in the form of an inclined exploded view largely corresponds to that shown in FIG. 1. Identical details have been given identical reference numbers. With a total of eight balls 6, the cage 7 comprises four circumferentially distributed cage windows 10 which each receive pairs of balls 6 guided in adjoining parallel ball tracks 3, 5. A joint journal 15 is attached to the base part.

Figure 2B:
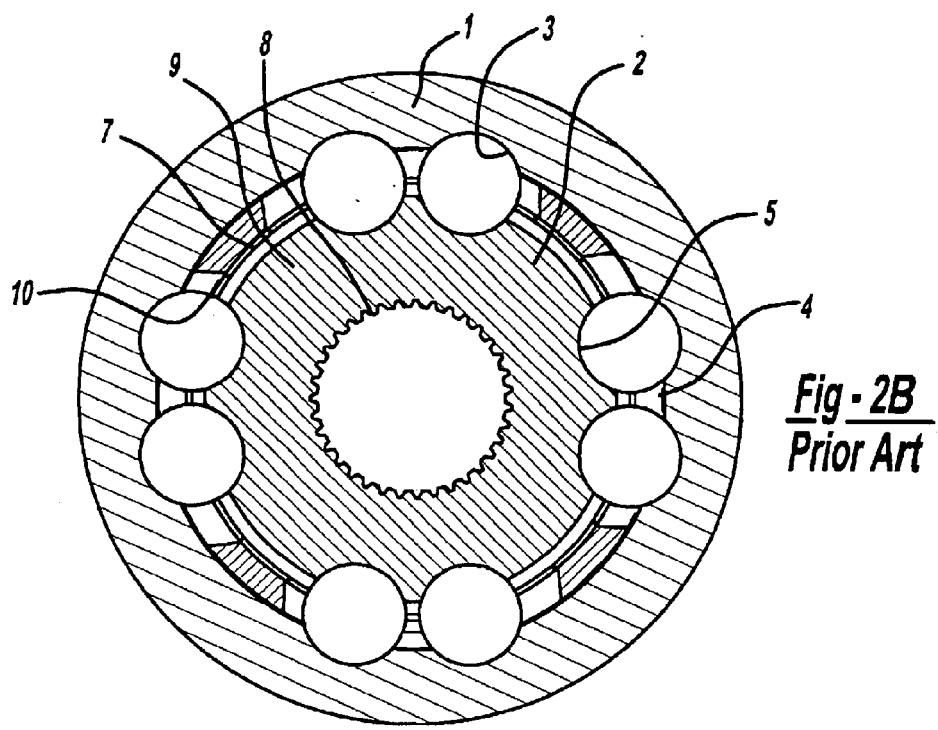
FIG. 2b is a cross-section through the assembled joint along line 2b—2b according to FIG. 1b.
Figure 2C:
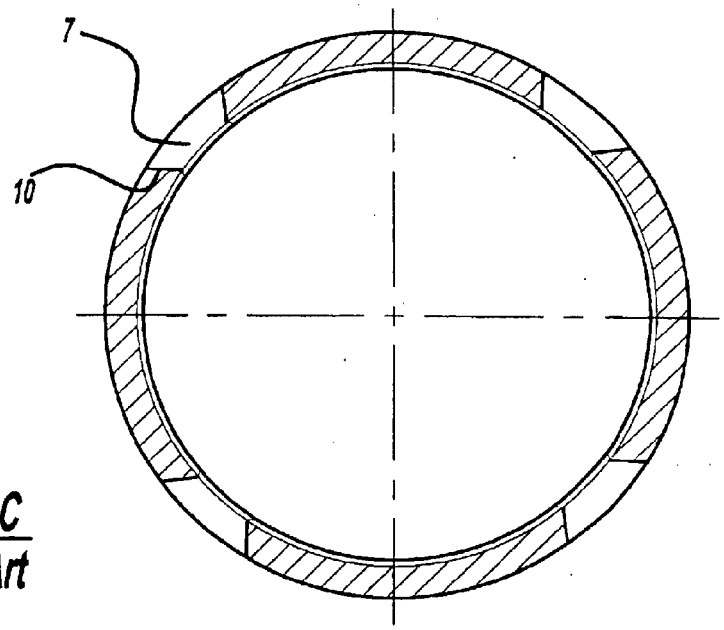
Figure 3:
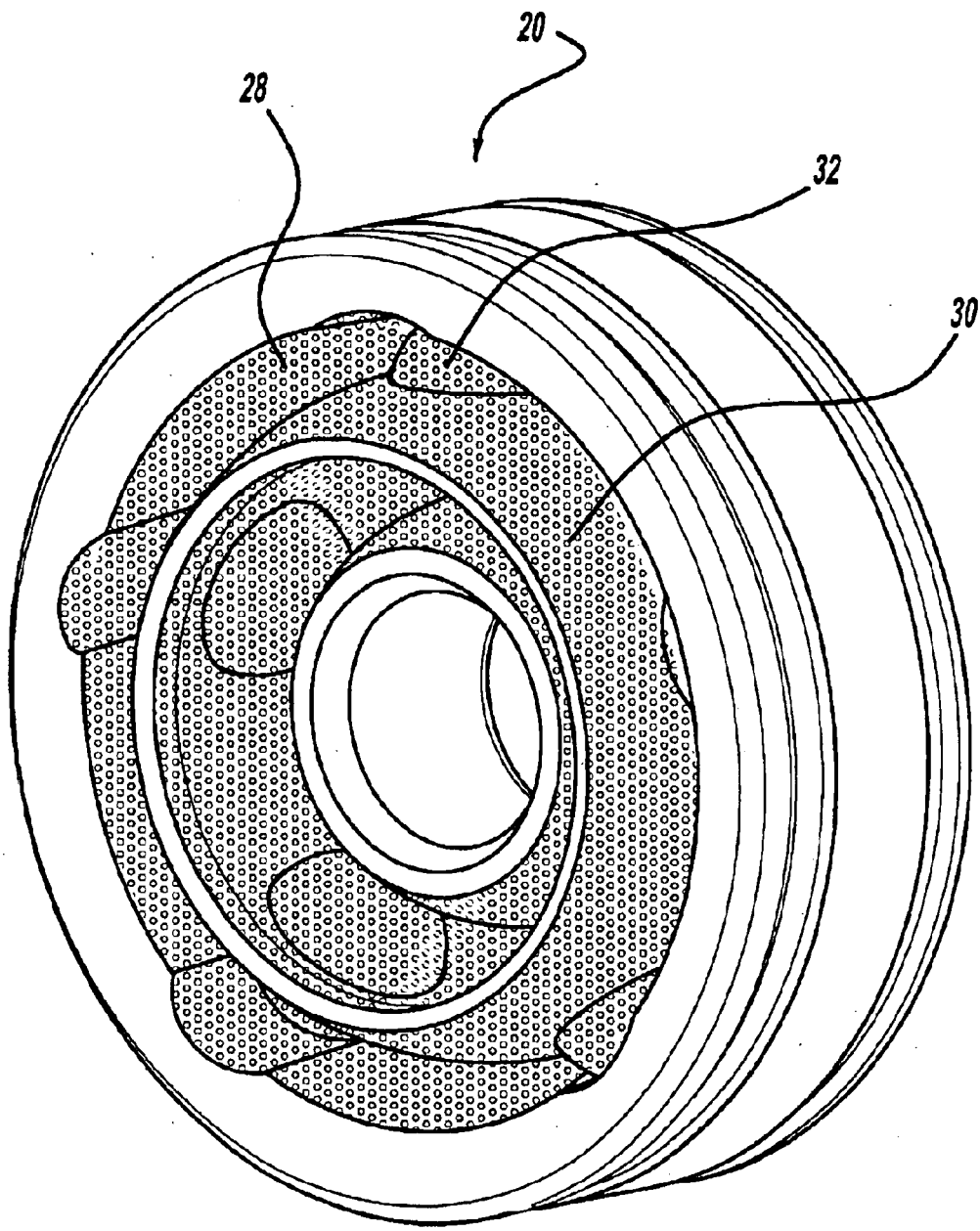
FIG. 3 is a perspective view of an improved constant velocity joint in accordance with the present invention.
Figure 4:
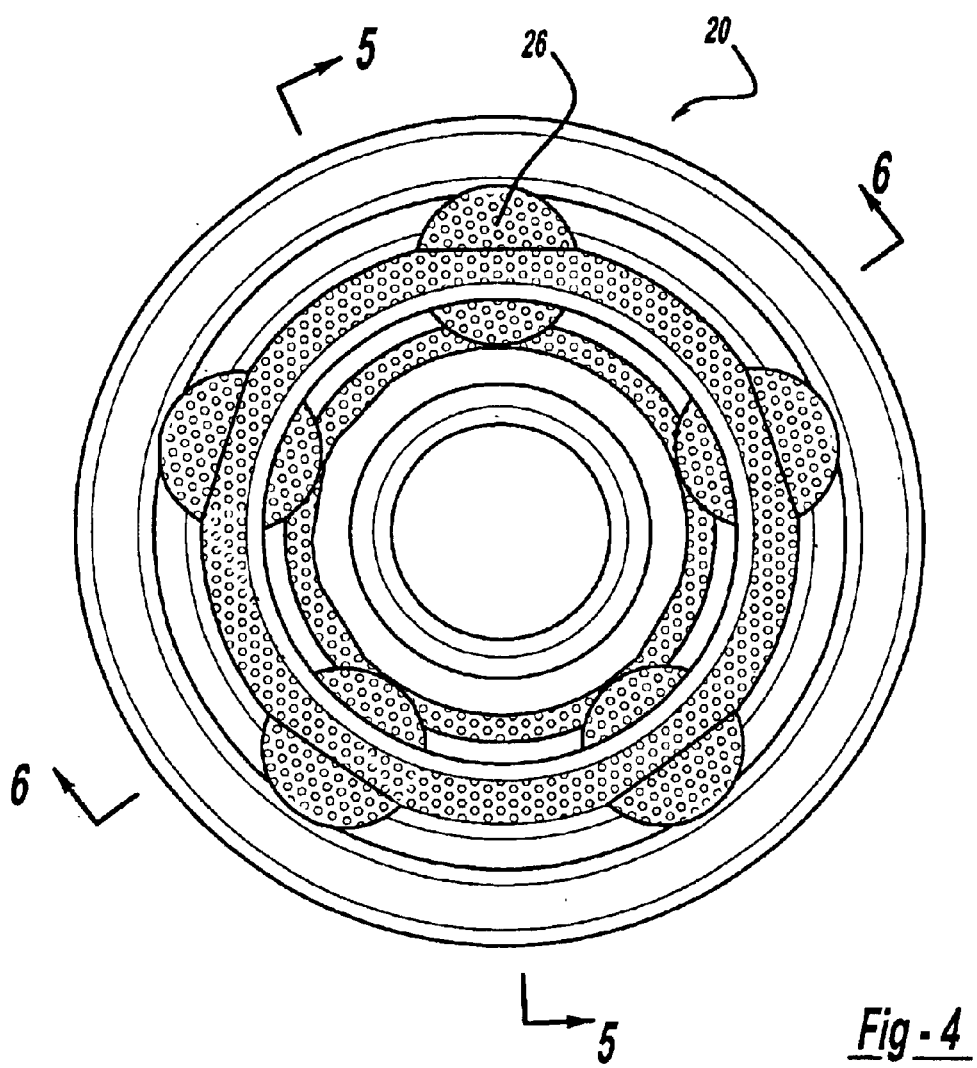
FIG. 4 is an axial view of the constant velocity joint of FIG. 3.
Figure 5:
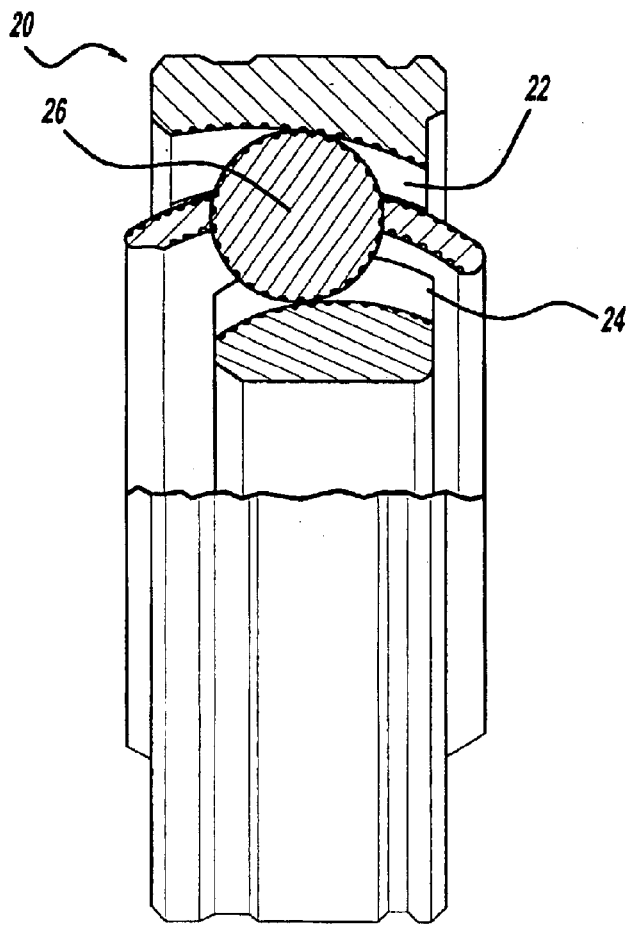
FIG. 5 is a cross-section through the assembled joint along line 3—3 according to FIG. 4.
Figure 6:
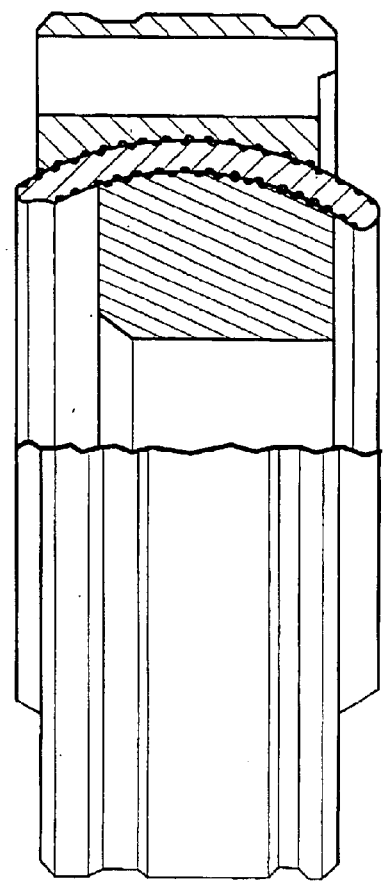
FIG. 6 is a cross-section through the assembled joint along line 44 according to FIG. 4.
Figure 7:
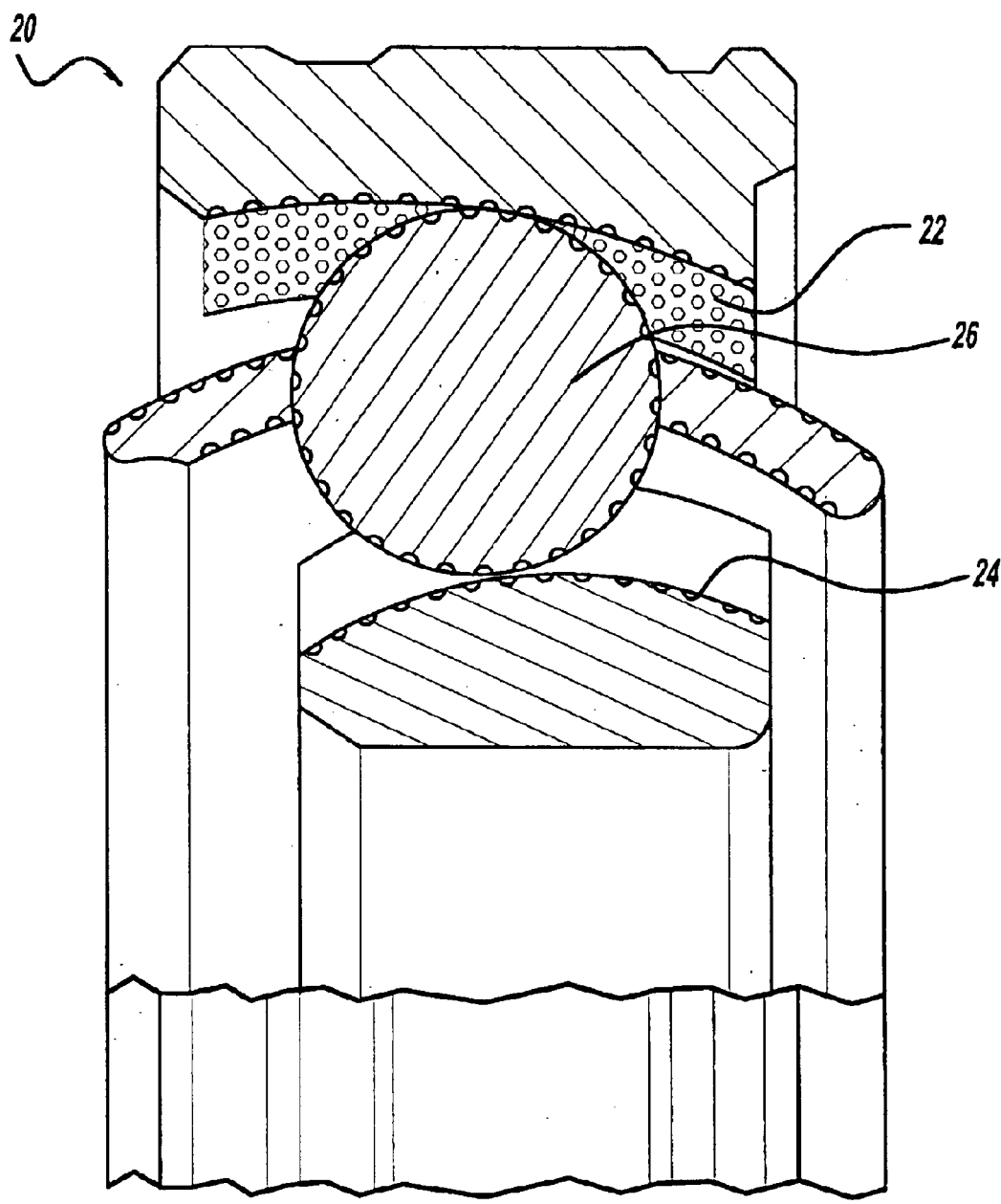
FIG. 7 is a cross-section through the assembled joint.
Figure 8:
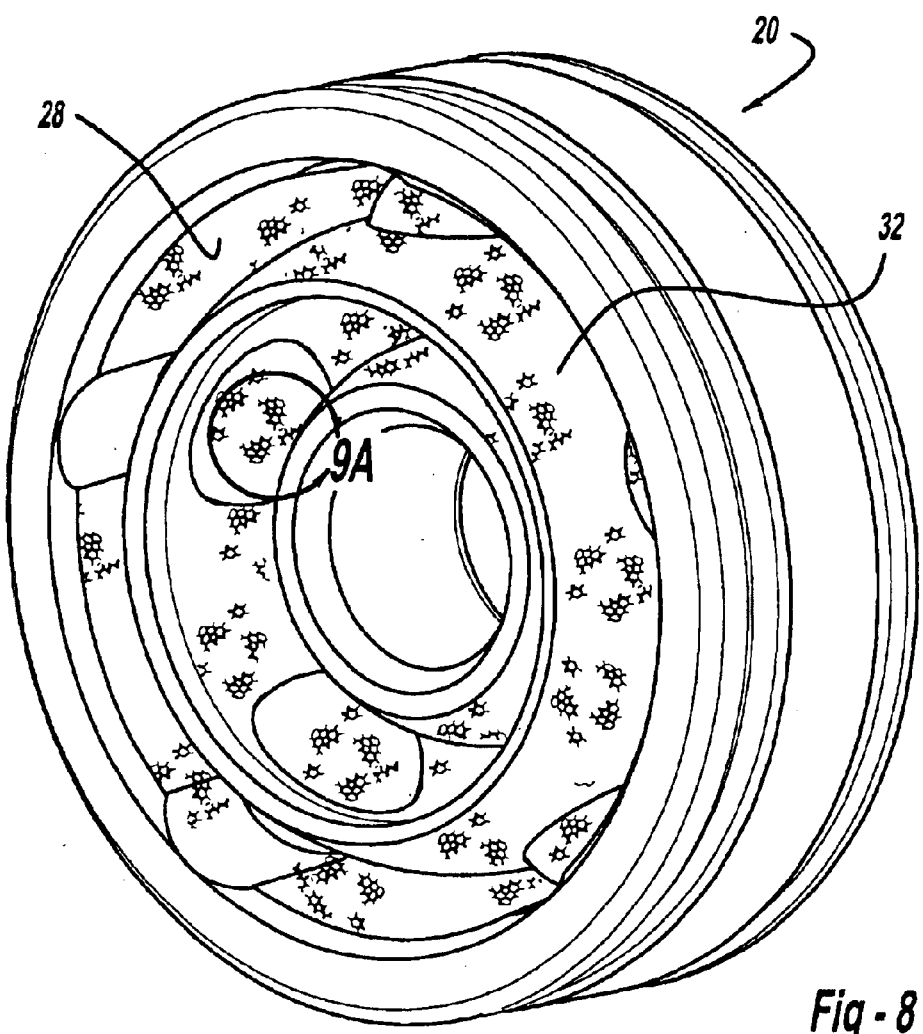
FIG. 8 is a perspective view of an alternative embodiment of the improved constant velocity joint of tile present invention.
Figure 9A:
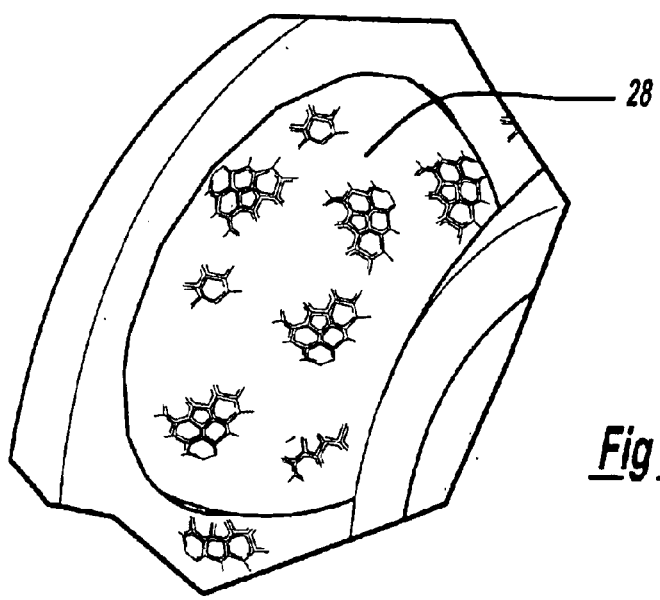
FIG. 9 is a an exploded perspective view of the corresponding section of FIG. 8.
Figure 10:
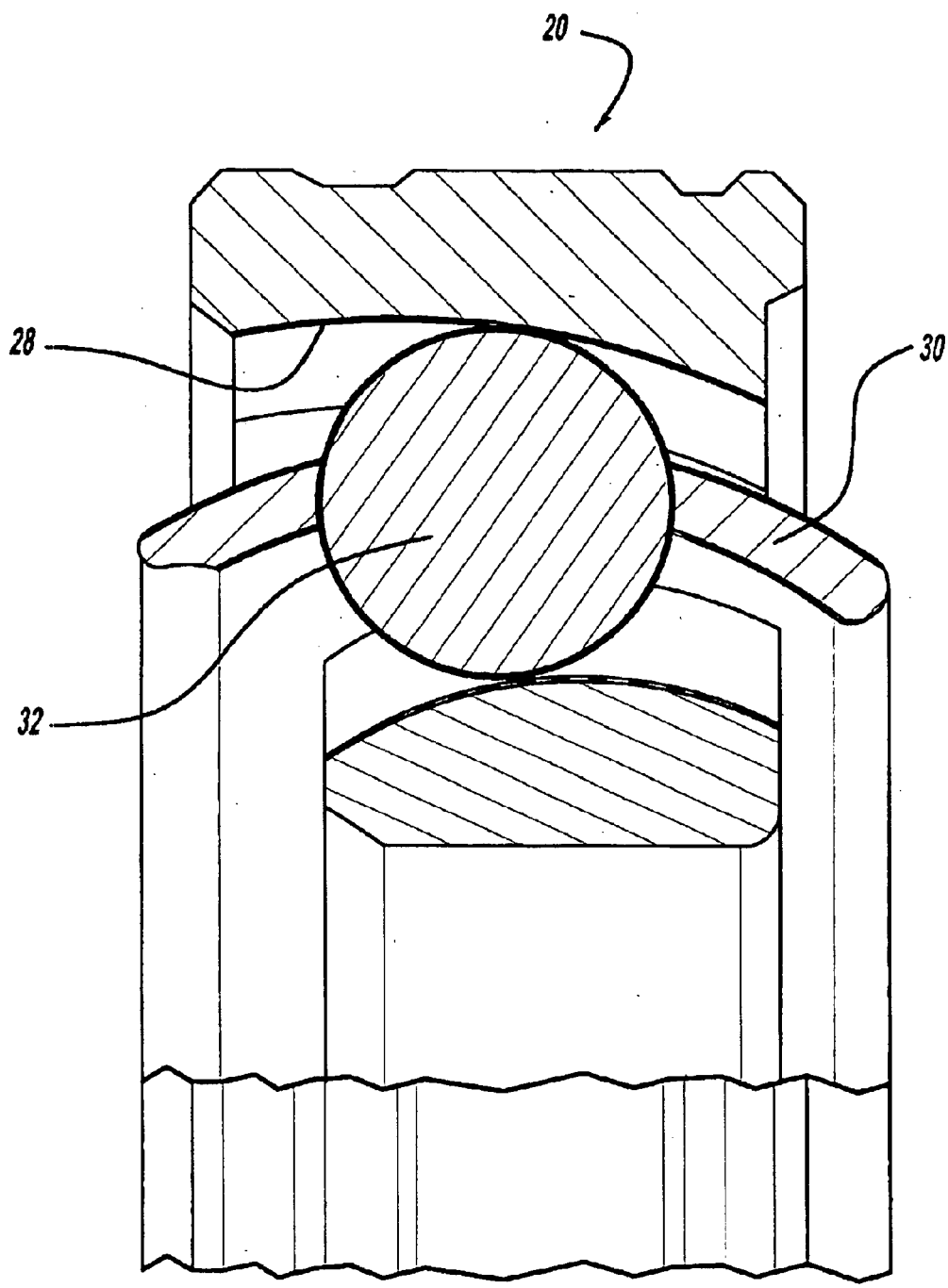
FIG. 10 is a cross section through the assembled joint.
Figure 11:
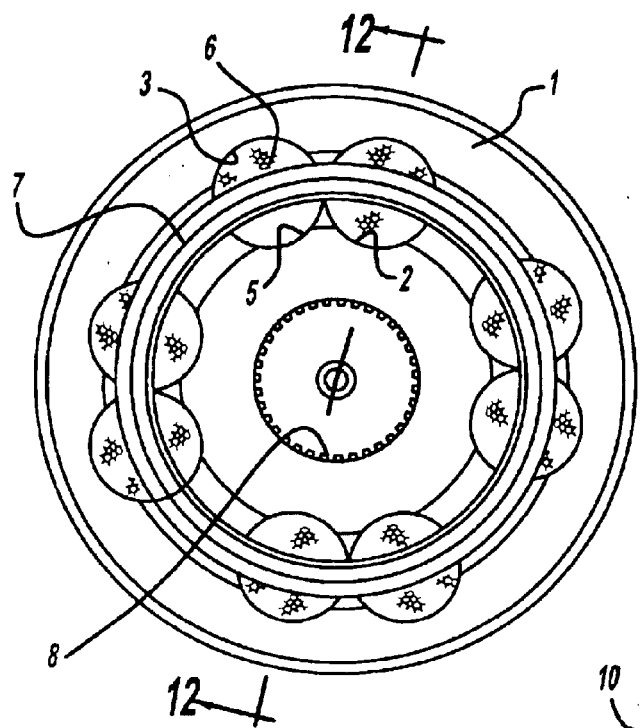
FIG. 11 is an axial view of the improved constant velocity joint of FIG. 8.
Figure 12:
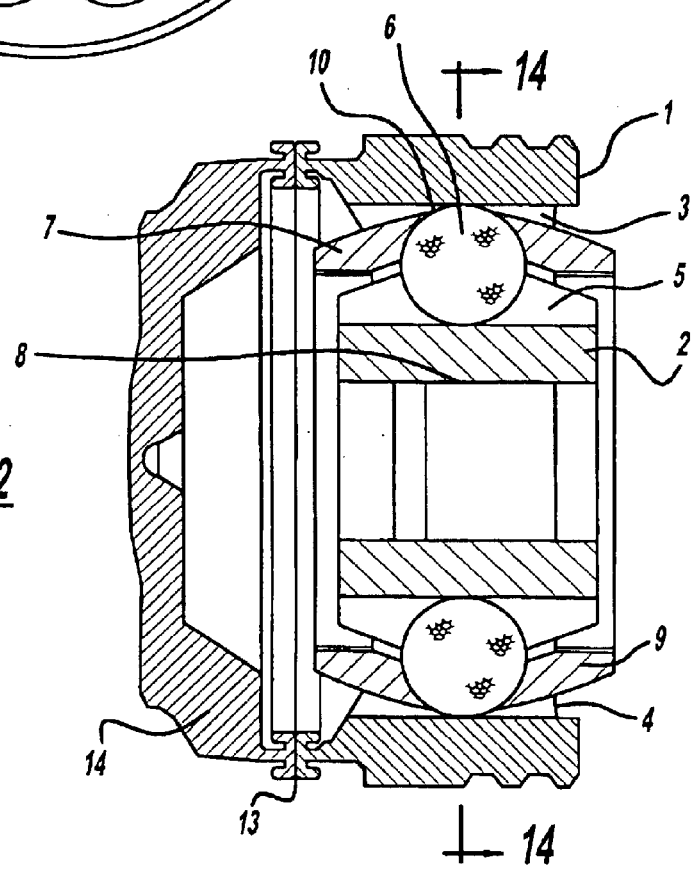
FIG. 12 is a cross-section through tile joint along line 12—12 according to FIG. 11.
Figure 13:
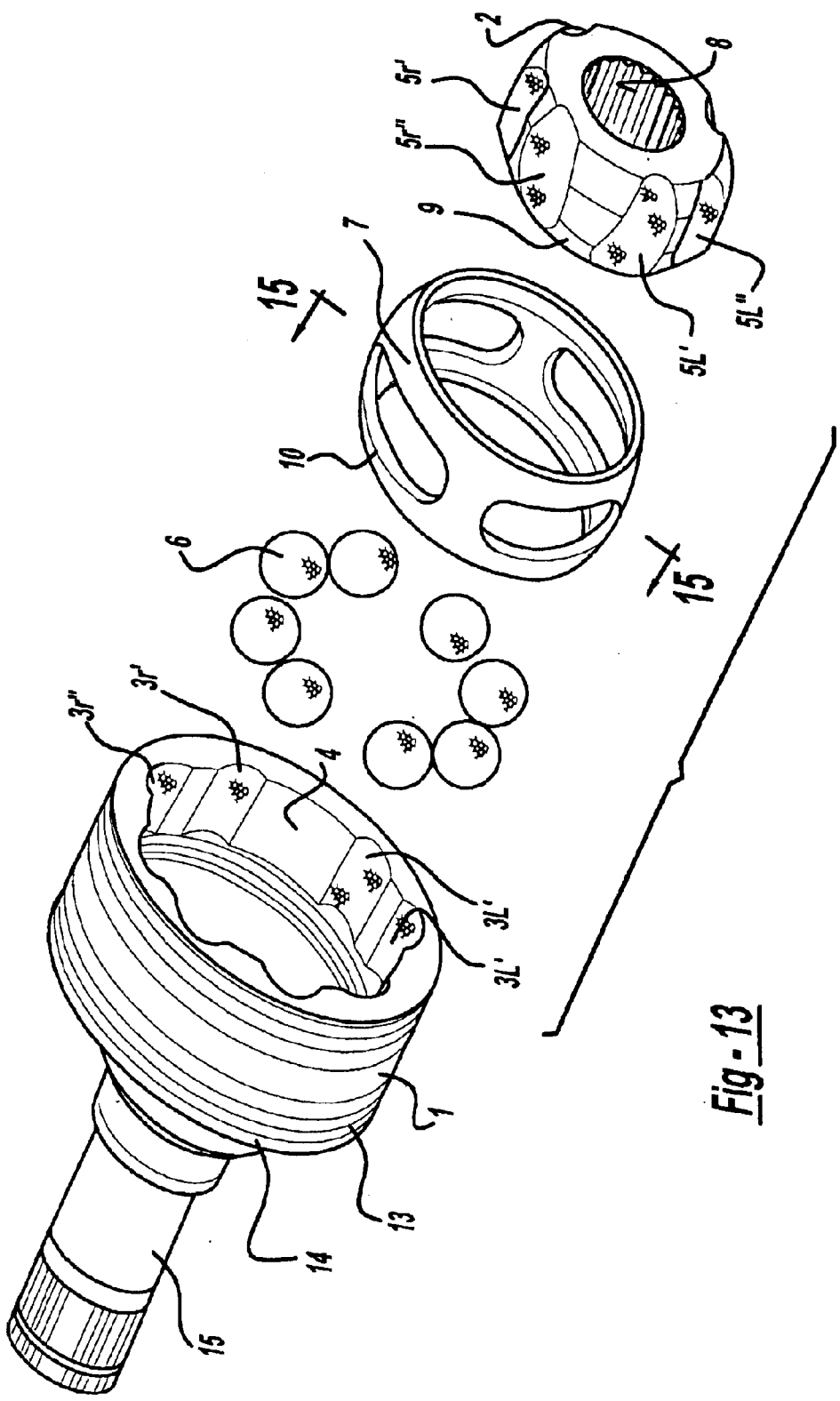
FIG. 13 is an exploded perspective view of the constant velocity joint of FIG. 8.
Figure 14:
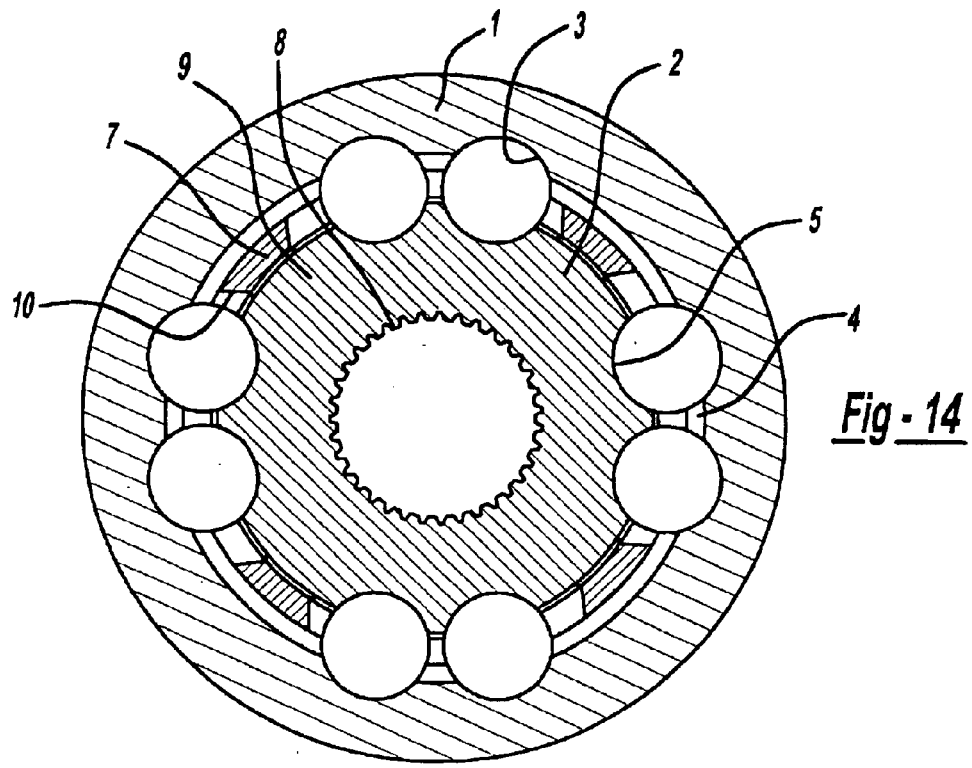
Figure 15:
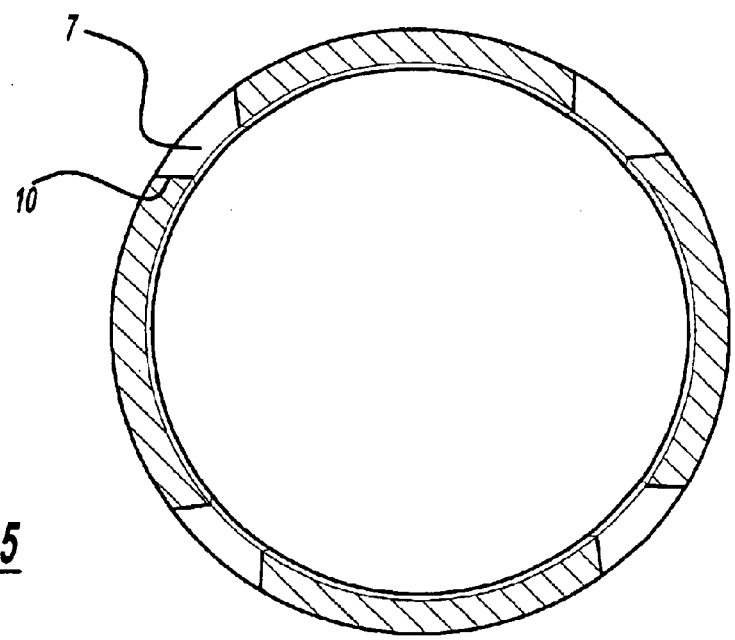
FIG. 15 is a cross-section through the joint along line 15—15 according to FIG. 13.

FIGS. 2b and 2c partly show the details referred to in connection with FIG. 2a in a cross-sectional view through the assembled joint and through the ball cage. Identical details have been given identical reference numbers.

Turning now to FIGS. 3–7 of the drawings, there is shown the improved constant velocity joint of the present invention designated generally by reference numeral 20. In keeping with the invention, one or more of the outer ball tracks 22, the inner ball tracks 24, or the balls 26 are provided with textured surfaces to increase lubrication of the joint and provide increased lubricant distribution capabilities. The textured surfaces may take any form desired limited only by the specific application. For example, such surfaces may comprise dimples or dimple like surfaces similar to a golf ball and may, accordingly, comprise hexagonal, pentagonal, or similar shaped pits provided in the respective surfaces 28, 30, or 32. Still further, as shown, for example, in FIGS. 8–15, the textured surfaces may comprise raised ridges or a network of such ridges having suitable shapes such as hexagonal or pentagonal. In the specific example shown in FIGS. 8–15, the ridges comprise a tubular lattice network of interlocking hexagons and pentagons with rounded edges.

Figure 16:
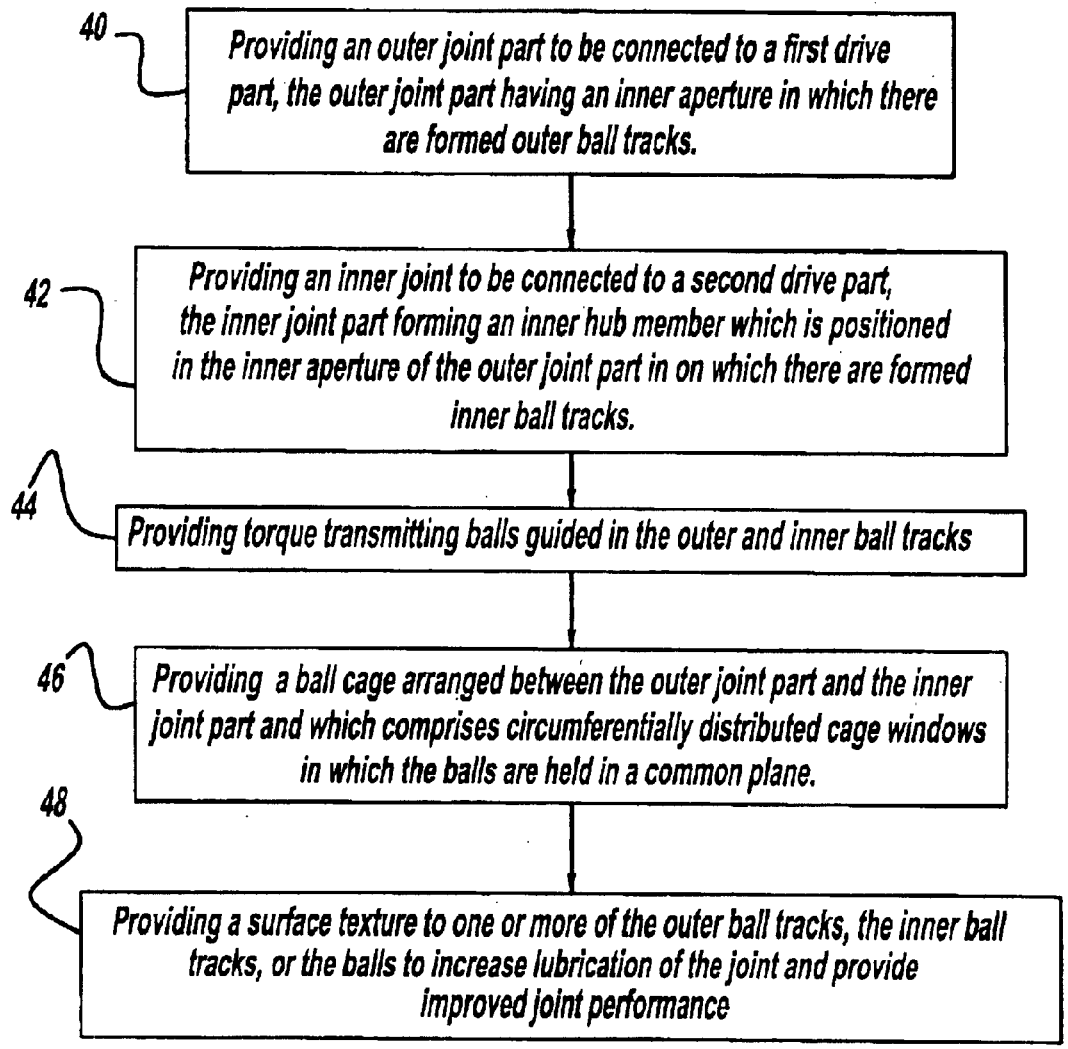
FIG. 16 is a block diagram of a method steps of the present invention.

Turning now to FIG. 16 of the drawings, there is described the method of the present invention for providing an improved constant velocity joint. The method comprises providing 40 an outer joint part to be connected to a first drive part, the outer joint part having an inner aperture in which there are formed outer ball tracks. The method further comprises providing 42 an inner joint to be connected to a second drive part, the inner joint part forming an inner hub member which is positioned in the inner aperture of the outer joint part in on which there are formed inner ball tracks. The method further comprises providing 44 torque transmitting balls guided in the outer and inner ball tracks. Still further the method comprises providing 46 a ball cage arranged between the outer joint part and the inner joint part and which comprises circumferentially distributed cage windows in which the balls are held in a common plane. Finally, the method comprises providing 48 a surface texture to one or more of the outer ball tracks, the inner ball tracks, or the balls to increase lubrication of the joint and provide improved joint performance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A constant velocity ball joint, comprising:
an outer joint part to be connected to a first drive part, and provided with an inner aperture in which there are formed outer ball tracks;
an inner joint part to be connected to a second drive part, and which forms an inner hub member which is positioned in the inner aperture of the outer joint part and on which there are formed inner ball tracks; and
torque transmitting balls guided in the outer and inner ball tracks;
a ball cage arranged between the outer joint part and the inner joint part and which comprises circumferentially distributed cage windows in which the balls are held in a common plane;
wherein one or more of the outer ball tracks, the inner ball tracks, or the balls have textured surfaces to increase lubrication of the joint, the texture surfaces include microgrooves, the microgrooves comprise a plurality of dimples, the dimples being hexagonal shaped or pentagonal shaped.

2. A constant velocity ball joint, comprising:
an outer joint part to be connected to a first drive part, and provided with an inner aperture in which there are formed outer ball tracks;
an inner joint part to be connected to a second drive part, and which forms an inner hub member which is positioned in the inner aperture of the outer joint part and on which there are formed inner ball tracks; and
torque transmitting balls guided in the outer and inner ball tracks;
a ball cage arranged between the outer joint part and the inner joint part and which comprises circumferentially distributed cage windows in which the balls are held in a common plane;

wherein one or more of the outer ball tracks, the inner ball tracks, or the balls have textured surfaces to increase lubrication of the joint, wherein the texture surfaces include a tubular lattice network.

3. A constant velocity joint as in claim 2, wherein the tubular lattice network is raised and comprises a plurality of interlocking hexagons and pentagons with rounded edges.

4. A method of making a constant velocity ball joint, comprising;

providing an outer joint part to be connected to a first drive part, the outer joint part having an inner aperture in which there are formed outer ball tracks;

providing an inner joint part to be connected to a second drive part, the inner joint part forming an inner hub member which is positioned in the inner aperture of the outer joint part and on which there are formed inner ball tracks; and providing torque transmitting balls guided in the outer and inner ball tracks;

providing a ball cage arranged between the outer joint part and the inner joint part and which comprises circumferentially distributed cage windows in which the balls are held in a common plane;

providing a surface texture to one or more of the outer ball tracks, the inner ball tracks, or the balls to increase lubrication of the joint, the surface texture includes microgrooves, the microgrooves comprise a plurality of dimples, the dimples are hexagonal shaped or pentagonal shaped.

5. A method of making a constant velocity ball joint, comprising;

providing an outer joint part to be connected to a first drive part, the outer joint part having an inner aperture in which there are formed outer ball tracks;

providing an inner joint part to be connected to a second drive part, the inner joint part forming an inner hub member which is positioned in the inner aperture of the outer joint part and on which there are formed inner ball tracks; and providing torque transmitting balls guided in the outer and inner ball tracks;

providing a ball cage arranged between the outer joint part and the inner joint part and which comprises circumferentially distributed cage windows in which the balls are held in a common plane;

providing a surface texture to one or more of the outer ball tracks, the inner ball tracks, or the balls to increase lubrication of the joint wherein the textured surfaces include a tubular lattice network.

6. A method as in claim 5, wherein the tubular lattice network is raised and comprises a plurality of interlocking hexagons and pentagons with rounded edges.

* * * * *